US012660898B1

(12) United States Patent
Feuerstein

(10) Patent No.: US 12,660,898 B1
(45) Date of Patent: Jun. 23, 2026

(54) MOVABLE UMBRELLA HOLDER

(71) Applicant: Stefan J. Feuerstein, Chicago, IL (US)

(72) Inventor: Stefan J. Feuerstein, Chicago, IL (US)

( * ) Notice: Subject to any disclaimer, the term of this patent is extended or adjusted under 35 U.S.C. 154(b) by 0 days.

(21) Appl. No.: 19/232,123

(22) Filed: Jun. 9, 2025

(51) Int. Cl.
| | |
|---|---|
| *A45B 11/00* | (2006.01) |
| *A01K 97/10* | (2006.01) |
| *A45B 17/00* | (2006.01) |
| *A45B 23/00* | (2006.01) |
| *A47B 37/04* | (2006.01) |
| *A47C 7/66* | (2006.01) |
| *E04H 12/22* | (2006.01) |
| *F16M 11/04* | (2006.01) |
| *F16M 11/10* | (2006.01) |
| *F16M 11/20* | (2006.01) |

(52) U.S. Cl.
CPC ............. *A45B 11/00* (2013.01); *A01K 97/10* (2013.01); *A45B 17/00* (2013.01); *A47B 37/04* (2013.01); *A47C 7/664* (2018.08); *E04H 12/2215* (2013.01); *E04H 12/2253* (2013.01); *E04H 12/2284* (2013.01); *F16M 11/046* (2013.01); *F16M 11/10* (2013.01); *F16M 11/2085* (2013.01); *A45B 2023/0012* (2013.01); *A45B 2023/0025* (2013.01); *F16M 2200/025* (2013.01)

(58) Field of Classification Search
CPC ......... A47C 7/624; A47C 7/644; A47C 7/664; F16M 11/046; F16M 11/2085; F16M 11/425; F16M 2200/025; A01K 97/10; A45B 17/00; A45B 11/00; E04H 12/2215; E04H 12/2253; E04H 12/2284; A47B 37/04

USPC .... 248/156, 298.1, 511, 518, 519, 530, 534, 248/535, 538, 539, 545; 297/184.16; 135/16; 108/50.12, 97, 98, 149, 151, 108/141, 139; 52/839, 650.1, 653.2
See application file for complete search history.

(56) References Cited

U.S. PATENT DOCUMENTS

| | | | | | |
|---|---|---|---|---|---|
| 175,903 | A | * | 4/1876 | Batley ..................... | G11B 5/332 |
| | | | | | 248/538 |
| 378,829 | A | * | 2/1888 | Dutton ................. | H01Q 1/1221 |
| | | | | | 248/539 |
| 581,524 | A | * | 4/1897 | Smith .................... | F16M 11/24 |
| | | | | | 248/295.11 |
| 640,446 | A | * | 1/1900 | Converse ............... | A01K 97/10 |
| | | | | | 248/541 |

(Continued)

*Primary Examiner* — Robert Canfield
(74) *Attorney, Agent, or Firm* — Sanchelima & Associates, P.A.; Christian Sanchelima; Jesus Sanchelima

(57) ABSTRACT

A that provides enhanced flexibility and positioning capabilities for outdoor umbrellas. The structure comprises a rail assembly with a support rail mounted on vertical poles that can be secured to ground or bases or to furniture by the use of clamps, and a holder assembly featuring a slidable pole holder. The allows users to adjust the umbrella's position along the support rail without needing to relocate the entire base, enabling precise shade positioning. The holder assembly includes a locking mechanism that can selectively fix the umbrella's position at desired locations. The is made from corrosion-resistant materials, the structure is particularly suited for challenging outdoor environments such as beaches, poolsides, and recreational areas. The telescopic and slidable nature of the support rail, combined with the movable or tiltable holder assembly, allows the umbrella placement and orientation.

17 Claims, 17 Drawing Sheets

(56)                    References Cited

U.S. PATENT DOCUMENTS

| | | | | | |
|---|---|---|---|---|---|
| 1,133,989 | A | * | 3/1915 | Leek | H01Q 1/1221 248/539 |
| 1,564,703 | A | * | 12/1925 | Nichols | B60R 13/00 224/558 |
| 2,491,008 | A | * | 12/1949 | Lake | A01K 97/10 224/103 |
| 2,548,351 | A | * | 4/1951 | Coombs | A01K 97/10 248/516 |
| 2,559,421 | A | * | 7/1951 | Garrett | A45B 11/00 403/104 |
| 2,782,085 | A | * | 2/1957 | Natale | A47B 3/12 108/158 |
| 2,912,196 | A | * | 11/1959 | Johnson | A01K 97/10 248/514 |
| 2,988,310 | A | * | 6/1961 | Wright | A45B 11/00 248/229.15 |
| 3,065,334 | A | * | 11/1962 | Hillenbrand | F21V 21/34 16/96 R |
| 3,304,035 | A | * | 2/1967 | Davis | A45B 11/00 248/516 |
| 3,304,036 | A | * | 2/1967 | Davis | A63B 55/60 280/DIG. 6 |
| 3,407,825 | A | * | 10/1968 | Doyle | A45B 11/00 135/900 |
| 3,490,190 | A | * | 1/1970 | See | E04G 1/00 52/844 |
| 3,694,990 | A | * | 10/1972 | Pamer | E04C 3/06 29/463 |
| 3,848,838 | A | * | 11/1974 | Thomas | A47C 7/66 248/231.51 |
| 4,852,291 | A | * | 8/1989 | Mengo | A01K 97/10 269/283 |
| 5,120,016 | A | * | 6/1992 | Dysarz | A01K 97/10 248/539 |
| 5,142,809 | A | * | 9/1992 | O'Brien | A01K 97/10 248/514 |
| D335,254 | S | * | 5/1993 | Carter | D8/380 |
| 5,438,789 | A | * | 8/1995 | Emory | A01K 97/10 248/514 |
| 5,727,583 | A | * | 3/1998 | Kennedy | E04H 12/2284 135/25.4 |
| 5,857,658 | A | * | 1/1999 | Niemiec | A47B 37/04 248/539 |
| 5,996,511 | A | * | 12/1999 | Swoger | A47B 57/26 108/151 |
| 6,421,979 | B1 | * | 7/2002 | Fischer | B29C 65/567 52/836 |
| 6,487,977 | B1 | * | 12/2002 | Williams | E04H 12/2223 108/150 |
| 6,591,541 | B1 | * | 7/2003 | Cummings | A01K 97/10 248/514 |
| 6,672,559 | B1 | * | 1/2004 | Boldia | A01K 97/10 248/538 |
| 6,898,893 | B1 | * | 5/2005 | Mukdaprakorn | A01K 97/10 248/538 |
| 7,114,281 | B2 | * | 10/2006 | Miller | A01K 97/10 43/21.2 |
| 7,296,377 | B2 | * | 11/2007 | Wilcox | A01K 97/10 248/541 |
| 7,334,593 | B2 | * | 2/2008 | Avery | A45B 1/00 248/541 |
| 7,395,828 | B1 | * | 7/2008 | Pulley | A45B 11/00 403/115 |
| 7,434,775 | B2 | * | 10/2008 | Wilcox | G09F 7/18 248/231.91 |
| 7,448,590 | B1 | * | 11/2008 | Holton | G09F 17/00 248/539 |
| 7,530,324 | B2 | * | 5/2009 | Salerno | A01K 97/10 114/364 |
| 7,926,496 | B2 | * | 4/2011 | Young | A45B 17/00 135/20.1 |
| 8,201,383 | B2 | * | 6/2012 | Garau | E04C 3/06 52/836 |
| 8,291,832 | B2 | * | 10/2012 | Fisher | B60R 9/06 108/44 |
| 8,308,123 | B1 | * | 11/2012 | Accordino | A45B 23/00 248/220.21 |
| 8,430,052 | B2 | * | 4/2013 | Nihra | G09F 21/04 116/28 R |
| 8,607,714 | B2 | * | 12/2013 | Ramberg | A45B 17/00 108/50.12 |
| 8,720,708 | B1 | * | 5/2014 | Gilmore | A47B 96/02 211/205 |
| 8,800,196 | B2 | * | 8/2014 | Baumann | A01K 97/10 248/536 |
| 8,878,733 | B2 | * | 11/2014 | He | H01Q 3/08 343/703 |
| 9,243,747 | B2 | * | 1/2016 | Ramberg | A45B 23/00 |
| 9,644,385 | B2 | * | 5/2017 | Ngu | E04H 12/2238 |
| 9,851,050 | B1 | * | 12/2017 | Cano | A45B 11/00 |
| 10,059,407 | B1 | * | 8/2018 | Ingalls | B63B 17/02 |
| 10,624,479 | B2 | * | 4/2020 | Thomas | A47C 7/68 |
| 10,765,185 | B1 | * | 9/2020 | Wengerd | F16B 2/185 |
| 11,653,765 | B2 | * | 5/2023 | Johnson | A47C 7/626 297/188.08 |
| 2003/0098403 | A1 | * | 5/2003 | Fox | F16M 13/022 248/538 |
| 2004/0135055 | A1 | * | 7/2004 | Rizk | A45B 11/00 248/539 |
| 2008/0029137 | A1 | * | 2/2008 | McInville | E04H 12/2269 248/539 |
| 2009/0114795 | A1 | * | 5/2009 | Giannetto | E04H 12/2253 248/530 |
| 2010/0059093 | A1 | * | 3/2010 | Clark | A45B 11/00 108/44 |
| 2011/0260029 | A1 | * | 10/2011 | Kost | A45B 11/00 224/533 |
| 2013/0247435 | A1 | * | 9/2013 | Bacik | G09F 23/00 40/606.03 |
| 2014/0238453 | A1 | * | 8/2014 | Zoeteman | A45B 11/00 135/15.1 |
| 2016/0192747 | A1 | * | 7/2016 | Rossi | A45B 25/00 135/16 |
| 2022/0099247 | A1 | * | 3/2022 | Builder | A45B 11/00 |
| 2025/0057136 | A1 | * | 2/2025 | Davidson | A01K 97/10 |

* cited by examiner

MOVABLE UMBRELLA HOLDER

BACKGROUND OF THE INVENTION

1. Field of the Invention

The present invention relates to umbrella support structures, specifically addressing a novel movable umbrella holder system designed to provide enhanced flexibility in shade positioning. More particularly, the invention introduces a lateral movement mechanism for umbrellas that allows precise repositioning along a fixed track while maintaining structural stability and integrity.

2. Description of the Related Art

Several designs for umbrella holders have been developed previously, with some prior art teaching concepts of slideable holders. However, these existing references fail to disclose the specific novel features of the present invention. While some prior art suggests rail systems for umbrellas, they do not teach the unique holder design, the specific structural details such as vertical supports, or the versatile mounting options including integration with furniture like lawn chairs. The present invention distinguishes itself through its innovative holder configuration, adaptable mounting system, and approach to providing flexible shade positioning that addresses limitations in existing umbrella support technologies.

Applicant believes that a related reference corresponds to patent No. DE202009017625U1 issued for a rail system for large umbrellas, in particular parasols, characterized in that the screen, including pedestal on a rail system of 0.5 to 50 m in length, can be moved by hand. However, DE202009017625U1 fails to disclose several key features of the present invention, including: (i) vertical supports extending downwardly from the distal ends of the horizontal rail that can be secured into the ground or mounted to weighted bases, (ii) internal truss structures within the support rail that provide enhanced structural stability while minimizing weight, (iii) a holder assembly incorporating both ball bearings and mechanical guides to ensure smooth movement while preventing rotational displacement, (iv) a tilt mechanism with mechanical stops to allow controlled angular adjustment of the umbrella, and (v) a pole holder with adjustable diameter accommodation through removable inserts. Additionally, DE202009017625U1 does not teach or suggest a modular design allowing the system to be adapted for different mounting configurations including ground insertion, weighted bases, or furniture attachment. Therefore, while DE202009017625U1 discloses a basic sliding umbrella concept, it lacks the specific structural features and versatility that characterize the present invention.

Applicant believes that another related reference corresponds to patent No. EP0070954A2 issued for a Screening device for sun rays with changing positioning and orientation. The patent EP0070954A2 foresees the stationing in a pleasant position, on the car top by means of transversal guides that can be made integral with it, of an emplacement bearing in the center of a parasol by means of coupling. By changing the position of the guides on the car top and of the emplacement on them, the most agreeable positioning of the parasol can be obtained. The sunshade stem foresees an articulated joint immediately above the coupling part, permitting thus to change the parasol orientation. By adjusting in this way the emplacement positioning and the stem orienting, the adjustment of the device is obtained to the contingent employ requirements. In order to get the composition of the stem integral with the emplacement in the wished position, the coupling axial cylinder foresees, on the circumference, a spaced set of bore couples which, laid on the portable diameters in position by rotation, separately correspond with a couple of bores on the coaxial to insert, permitting in this way to introduce a locking means by clamping.

Another related reference corresponds to WO2012163802 to Reinhold Hubner. Hubner discloses a rail device for parasols, having at least one rail, wherein the at least one rail has a substantially C-shaped design for receiving at least one roller. While Hubner's disclosure describes a system where an umbrella is attached to a slideable holder that moves along a horizontal rail. It fails to disclose, in one instance, the specific feature of vertical supports extending downward from the distal ends of the horizontal rail. In another instance, Hubner fails to disclose the novel holder design that connects the umbrella to the rail as herein foreseen. Therefore, while the core concept of a slideable holder on a horizontal rail is similar, the specific structural detail of vertical supports has not been disclosed or suggested by the prior art.

Another related reference is U.S. Pat. No. 840,241A to Ernst Nootbaar, pertaining to umbrella holders. Ernst discloses an articulated vertical rod with a clamping member at its bottom end. The clamp further features a threaded-adjusting screw cooperating with a fixed U-shaped jaw. At its uppermost end, the invention features a clamp consisting of two hinged jaws which are normally held apart by a spring. Ernst fails to disclose the specific features mentioned in the present invention, such as the slideable holder, horizontal rail, and vertical supports.

None of these references, however, teaches of a movable umbrella holder that provides enhanced flexibility and positioning capabilities for outdoor umbrellas. The structure comprises a rail assembly with a support rail that can be secured to various surfaces, and a holder assembly featuring a slidable pole holder. This movable umbrella holder allows users to adjust the umbrella's position along the support rail without needing to relocate the entire base, enabling precise shade positioning. The movable umbrella holder is made from corrosion-resistant materials; the structure is particularly suited for challenging outdoor environments such as beaches, poolsides, and recreational areas.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a movable umbrella holder that enables lateral adjustment of shade coverage without the need to relocate the base structure or disturb surrounding furniture arrangements.

It is another object of this invention to provide a movable umbrella holder incorporating a secure and reliable locking mechanism that prevents unintended movement of the umbrella position once set.

It is still another object of the present invention to provide a movable umbrella holder constructed from weather-resistant materials suitable for prolonged outdoor exposure and resistant to corrosion from environmental factors.

It is yet another object of the present invention to provide a movable umbrella holder with an adjustable diameter accommodation system capable of securing various umbrella pole sizes commonly available in the market.

It is a further object of the present invention to provide a movable umbrella holder with optional integrated features such as a tilt mechanism to enable additional shade reposi- tioning.

It is yet another object of the present invention to provide a movable umbrella holder that allows for the adjusting of the position and angle of the umbrella throughout the day as the sun shifts across the sky.

It is a further object of the present invention to provide a movable umbrella holder with optional integrated features such as a table attachment, towel hooks, or cell phone holder.

It is a further object of one of the embodiments of the present invention to provide a movable umbrella holder that can be attached to a lawn chair.

Further objects of the invention will be brought out in the following part of the specification, wherein a detailed description is for the purpose of fully disclosing the inven- tion without placing limitations thereon.

BRIEF DESCRIPTION OF THE DRAWINGS

With the above and other related objects in view, the invention consists in the details of construction and combi- nation of parts as will be more fully understood from the following description, when read in conjunction with the accompanying drawings in which:

FIG. 4 is a representation of an isometric view of an alternative embodiment of the present invention showing an alternative embodiment of the holder assembly 40 affixed to a lawn chair 100 by clamps 42a.

DETAILED DESCRIPTION OF THE EMBODIMENTS OF THE INVENTION

Figure 1:
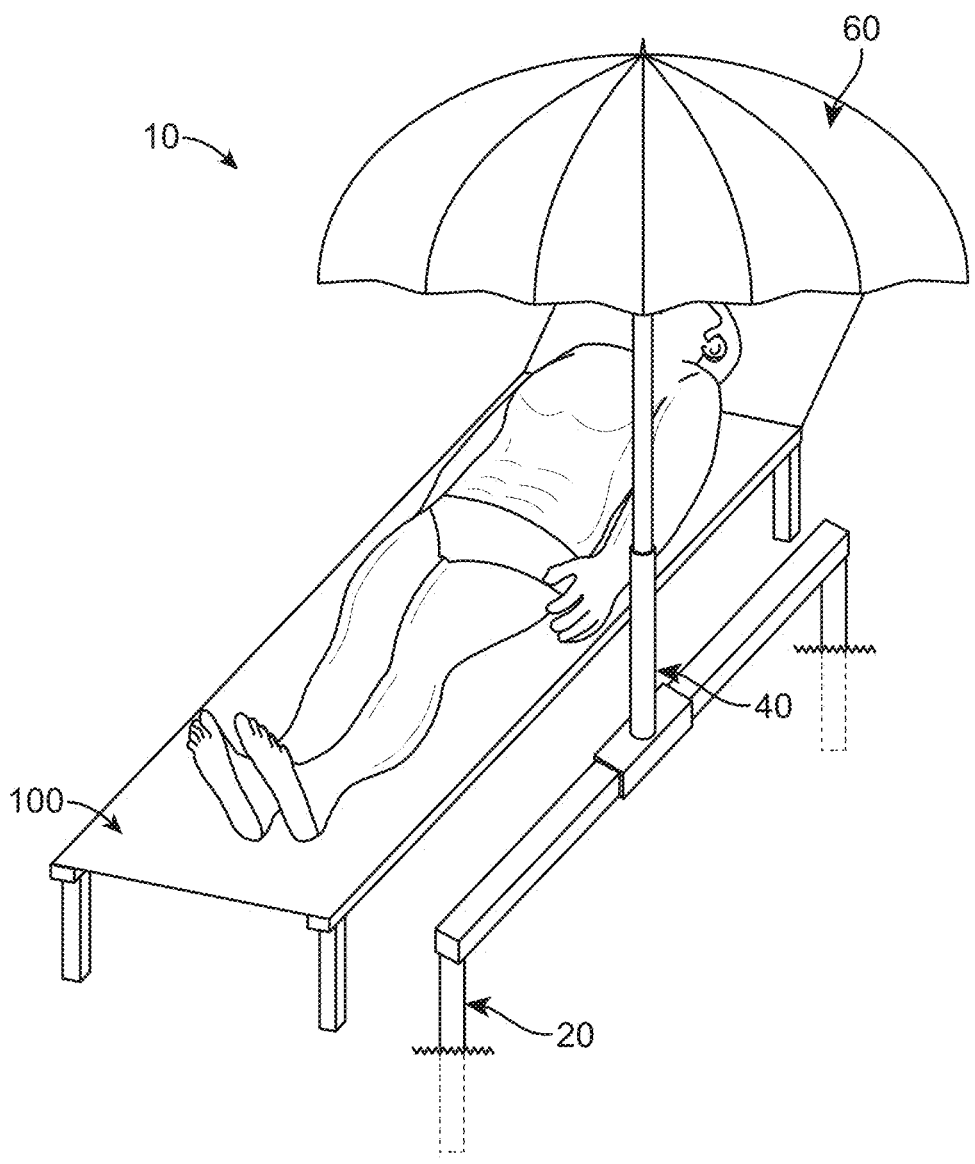
FIG. 1 represents an isometric operational view of the present invention 10.

Referring now to the drawings, where the present inven- tion is generally referred to with numeral 10, it can be observed that it basically includes a rail assembly 20, a holder assembly 40, and a umbrella assembly 60. It should be understood there are modifications and variations of the invention that are too numerous to be listed but that all fit within the scope of the invention. Alternative embodiments do not necessarily imply that the two are mutually exclusive.

Figure 5:
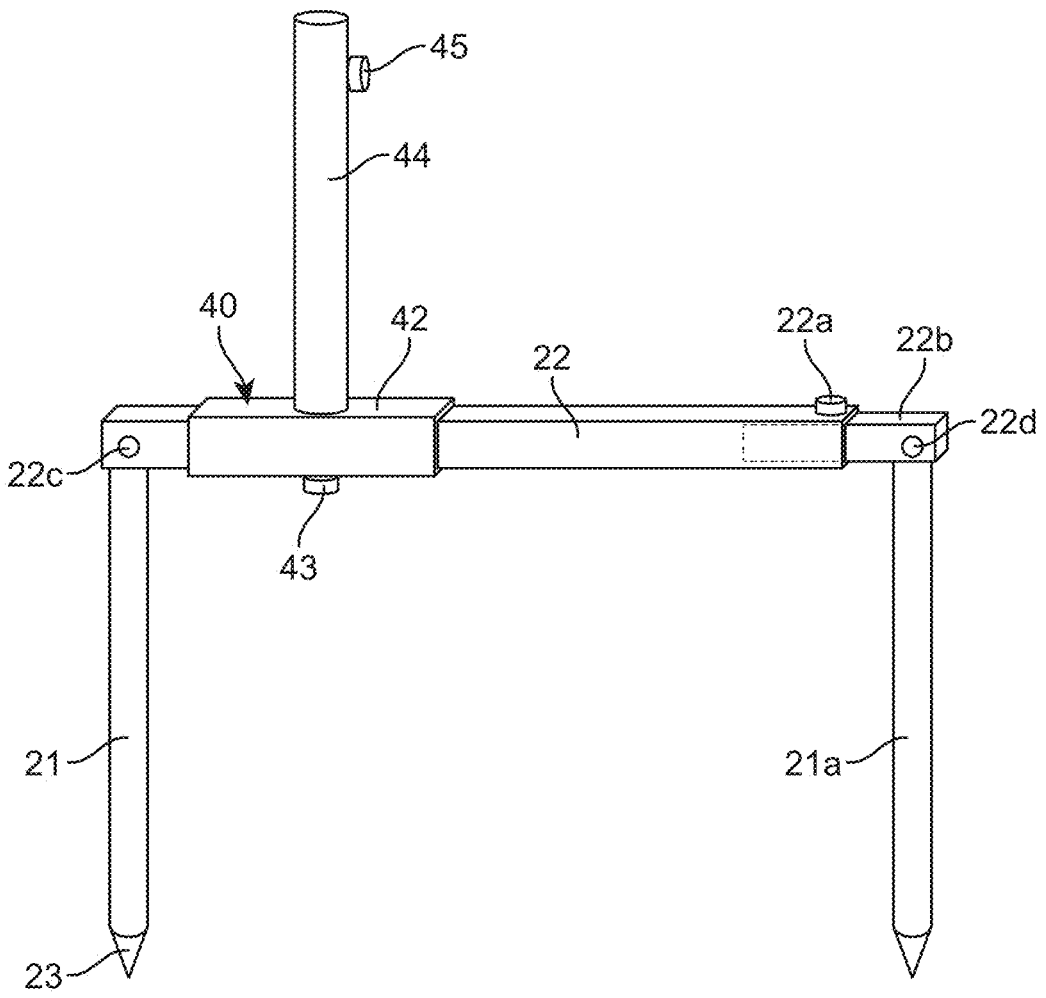
FIG. 5 is an enlarged view of the rail assembly 20 in one embodiment.
Figure 7:
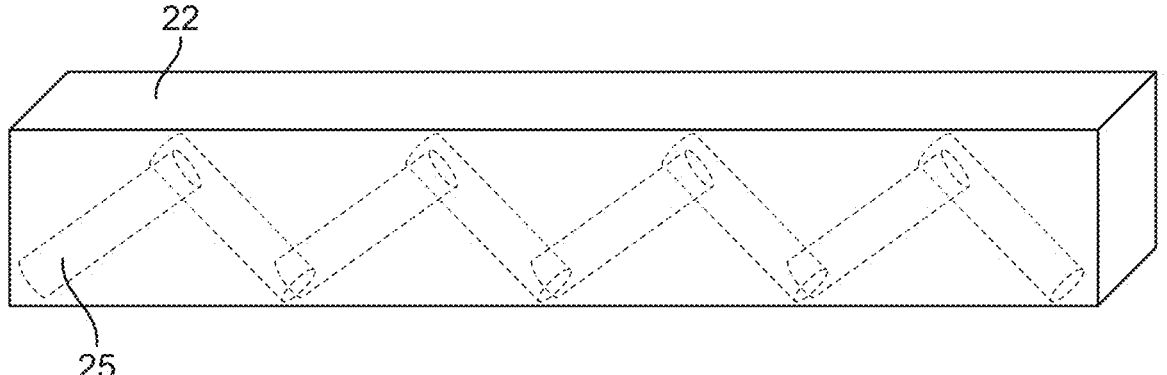
FIG. 7 is an enlarged view of one of the preferred embodiments of the support rail 22.

In one embodiment, the rail assembly 20 may include a first post 21 and second post 21a connected by a support rail 22 as observed in FIG. 5. The first post 21 and second post 21a may have a lower end with a sharpened portion 23 to be inserted into the ground. The first post 21 and second post 21a may be cylindrical posts. It also may be suitable to have the first post 21 and second post 21a with other suitable shapes. In one embodiment, the support rail 22 may have a plurality of internal trusses 25 located inside the support rail 22 as observed in FIG. 7. Trusses are structural frameworks that are designed to support loads and provide stability The trusses 25 may be arranged inside the support rail 22 to reinforce or stabilize the post by distributing forces more evenly, as shown in FIG. 7. This can prevent bending, buckling, or excessive loads on the post itself; furthermore, they increase the strength of the support rail 22 to support the weight of the umbrella assembly 60. The trusses 25 may be provided in honeycomb structural shapes, in triangular units—as triangles are inherently stable shapes—or any other suitable shape.

In one optional embodiment, the support rail 22 may be a telescopic rail including at least one slidable rail 22b extending from inside the support rail 22. The slidable rail 22b may slide along the support rail 22, defining an extend- able rail to enlarge or retract the length of the support rail 22 for easier installation. The support rail 22 may have a stopper 22a at a distal end thereof to delimit the range of movement of the holder assembly 40 when sliding along the support rail 22. The support rail 22 and slidable rail 22b may preferably have a square profile. It also may be suitable to have the support rail 22 and slidable rail 22b with other shapes. The slidable rail 22b may be slightly smaller in a transversal section than the transversal section of the support rail 22 to be fitted inside the support rail 22.

The rail assembly 20 further includes a first post 21 and a second post 21a, wherein each post is attached to one of the distal ends of the support rail as shown in FIG. 5. The first and second posts (21 and 21a) may be parallel to each other and perpendicular to a longitudinal axis of the support rail 22. In the embodiment where the support rail is not telescopic, the first post 21 is secured to the distal end of the support rail by means of a fastener 22c and the second post 21a is also attached to an opposite end of the support rail with a fastener. In the embodiment where the support rail is telescopic, the first post 21 is secured to the distal end of the support rail by means of a fastener 22c, and the second post 21a may be attached to a distal end of the slidable rail 22b by a fastener 22d. The first post 21, second post 21a, support rail 22 and slidable rail 22b may be made of metal, plastic, or any other suitable material to firmly support the umbrella assembly 60 despite environmental or operational factors.

The holder assembly 40 may include a holder base 42 with a pole holder 44 perpendicularly connected thereto. The pole holder 44 may be fused to the holder base 42, by welding the two parts together. In another embodiment, the holder base 42 and the pole holder 44 may be monolithic, this is formed from a single piece. The holder base 42 may be hollow so that the support rail 22 can be inserted therein as shown in FIG. 5. In a preferred embodiment, holder base 42 may have an internal opening shaped to receive the support rail 22; for instance, in one embodiment where the support rail 22 is a cylinder, then the holder base 42 may have a cylindrical internal opening. To broaden the aforementioned concept, it can be said that the internal cross-section of the holder base 22 coincides with the cross-section of support rail 22, wherein the cross-section is defined as a plane parallel to the base of the elongated element, e.g., the cross-section of a cylinder is a plane parallel to the base of the cylinder, which creates a circular cross-section. The holder base 42 may be slidable along the support rail 22 once mounted thereto. The holder base 42 may have a lock member 43, such as a pin or any other tightening device that secures the holder base 42 at a desired position along the support rail 22.

Figure 6:
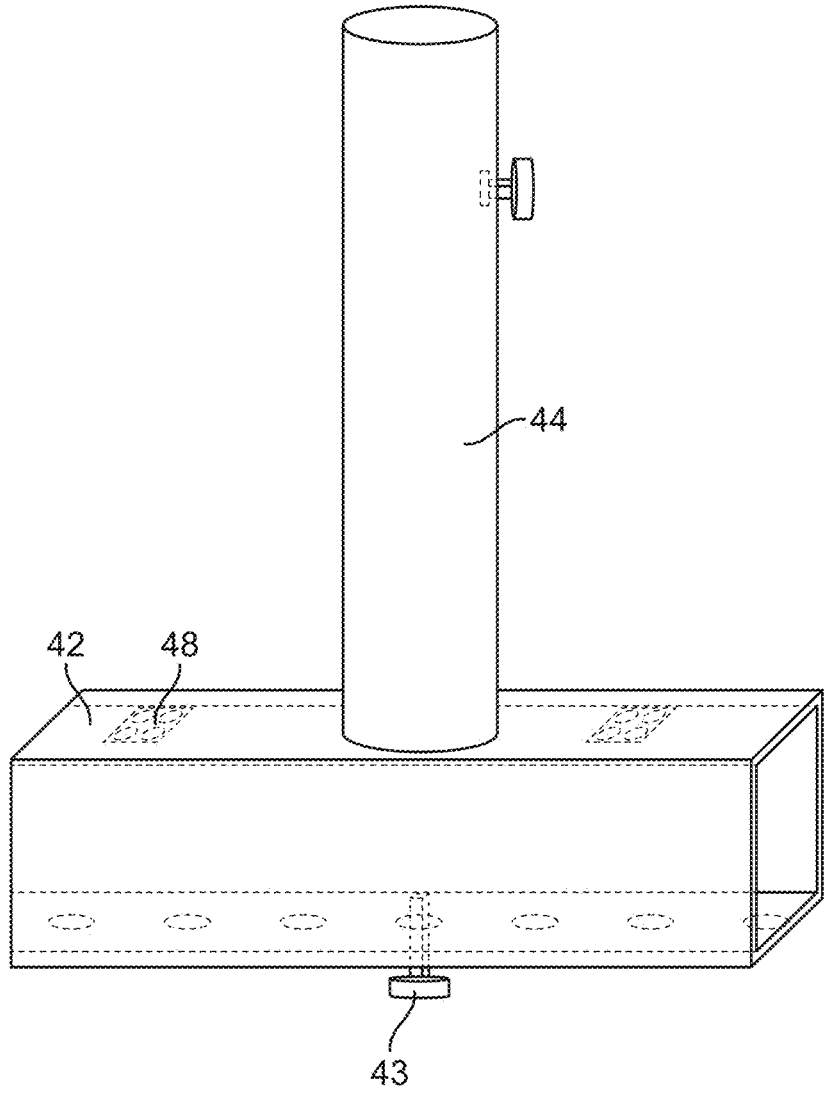
FIG. 6 is an enlarged view of the holder assembly 40 in one embodiment.
Figure 14:
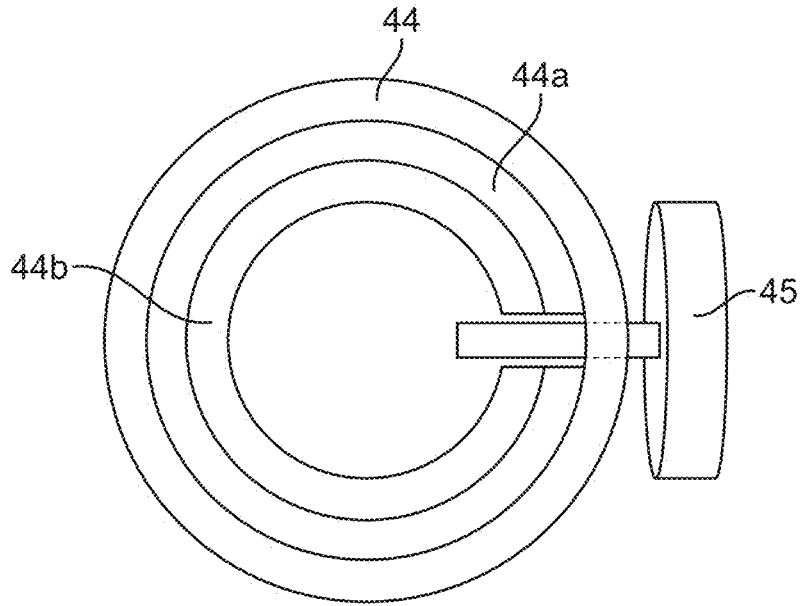
FIG. 14 is a top view of the pole holder 44 showing insertable poles to reduce an inner diameter thereof.

The pole holder 44 may be a cylindrical hollow tube with a top opening to receive the pole 62 of an umbrella assembly 60 therein. The pole holder 44 may have a second lock member 45, such as a pin or any other suitable tightening device that allows securing the pole 62 in place once inserted into the pole holder 44. Best observed in FIG. 14, the pole holder 44 may have a plurality of inserts designed to reduce its inner diameter; thereby its inner diameter can be adjusted or resized to fit umbrella poles of varying sizes, ensuring a secure fit for the pole regardless of its dimensions. For instance, in one exemplary embodiment, the pole holder 44 may have a first insert 44a, and a second insert 44b. The first insert 44a may have a diameter smaller than that of the holder base 42. The second insert 44b may have a diameter smaller than the first insert 44a. The first insert 44a and second insert 44b may be fitted into the pole holder 44 to reduce the inner diameter allowing fitting poles with different diameters. For example, a pole with a large diameter may be introduced into the pole holder 44 without any insert. A pole with smaller diameter may be inserted into the pole holder 44 having at least one of the inserts. The pole holder 44, first insert 44a and second insert 44b may have a hole to receive the second lock member 45 therein to secure a pole inside the pole holder 44. The second lock member 45 may prevent the pole 62 from being dislodged by wind or people or objects bumping into it. In one embodiment, the holder base 42 may further include ball bearings 48 located inside of the holder base 42, as observed in FIG. 6. The ball bearings 48 may allow an easy movement of the holder base 42 along the support rail 22.

Figure 3:
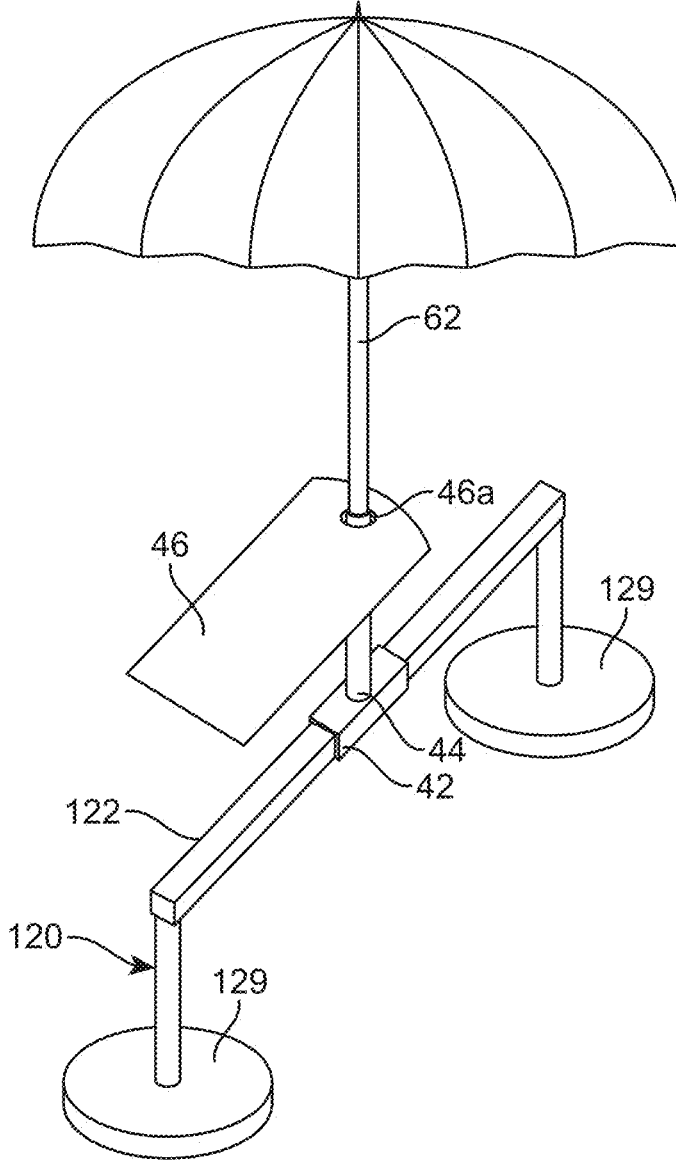
FIG. 3 illustrates an isometric view of an alternative embodiment of the present invention, showing a rotating table 46 adapted to the pole holder 44.

The pole holder 44 may further include a rotating table 46 coupled to the pole holder 44. The rotating table 46 may rotate around the pole holder 44 to be used by the user. The rotating table 46 may have a substantially rectangular shape. The rotating table 46 may be an integrated component. As shown in FIG. 3, it includes an attaching portion 46a, embodied as a hole, which allows it to be coupled to the pole holder 44. In alternative embodiments, the attaching portion may have a different design, provided that it still enables secure attachment to the pole holder 44. The term 'rotating table 46' is used because it is configured to be repositioned around its attachment center. Additionally, the table 46 may be affixed to any part of the pole holder 44, including its tilting sections—described in more detail below—or to a fixed, non-tilting section.

Figure 2:
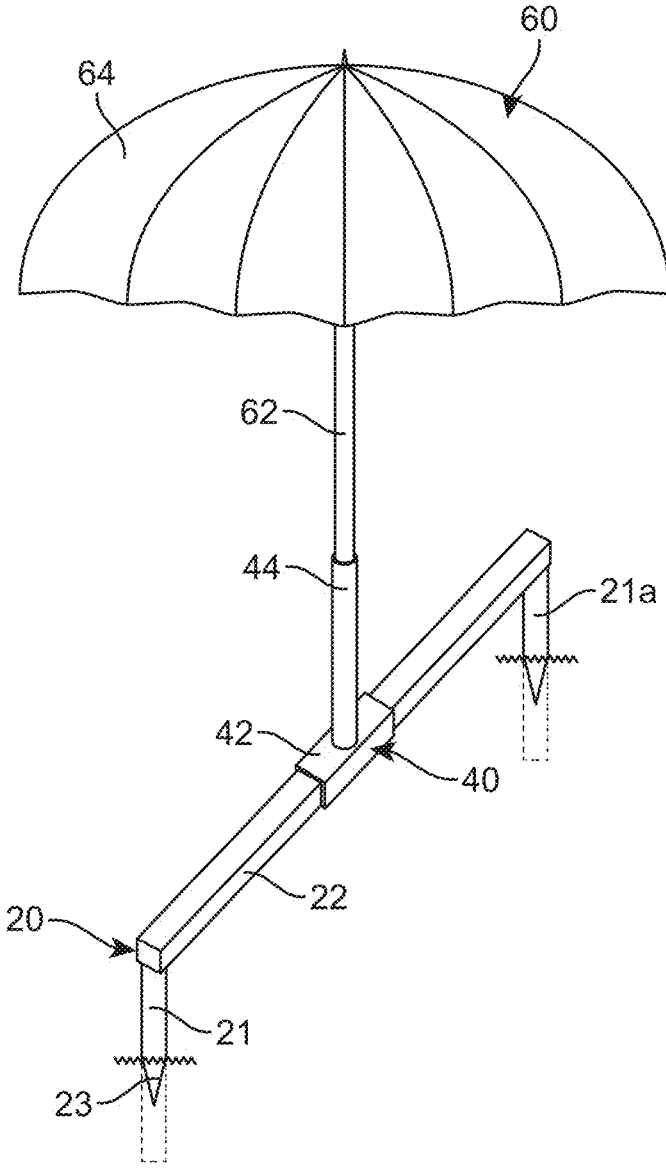
FIG. 2 shows an isometric view of one embodiment of the present invention, including the rail assembly 20, a holder assembly 40 and an umbrella assembly 60.

Best observed in FIG. 2, the first post 21 and second post 21a may allow the rail assembly 20 to be installed in the ground. The holder assembly 40 may be slidable along the support rail 22 to hold the umbrella assembly 60.

In the following sections, various embodiments of the present invention will be described. It is important to emphasize that these embodiments share the same fundamental concept and are not mutually exclusive. Additionally, the features of the alternative embodiments are not confined to specific configurations. While each embodiment is described individually for clarity, their features can be combined in any manner without departing from the scope of the appended claims.

First Alternative Embodiment

Figure 4:
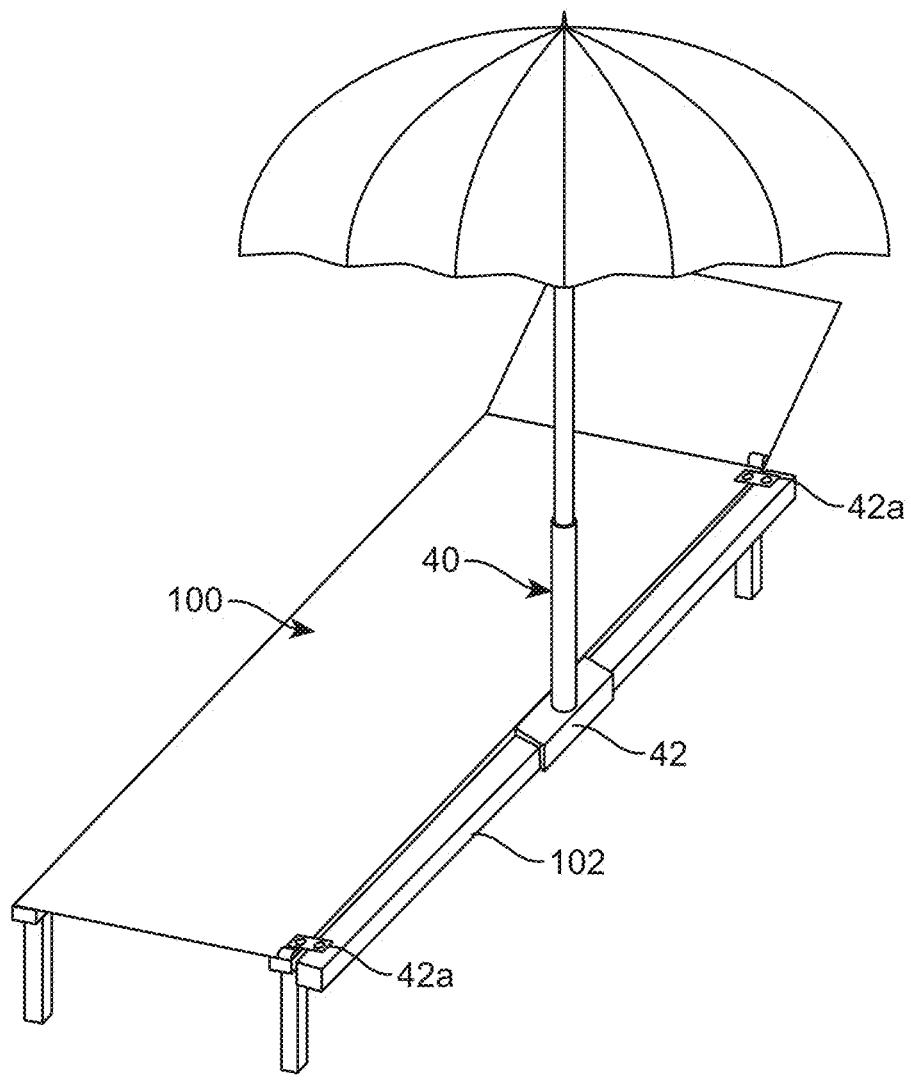

Referring now to FIG. 4, an alternative embodiment of the invention may include a lawn chair 100 with the holder assembly 40 slidably coupled and integrated to a lateral rod 102 of the frame of the lawn chair 100 by clamps 42a. The holder assembly 40 may be built in to the lawn chair 100. The support rail may have clamps 42a instead of legs to removably attach the support rail 22 to the lawn chair 100, or any other piece of furniture like a table.

Figure 8:
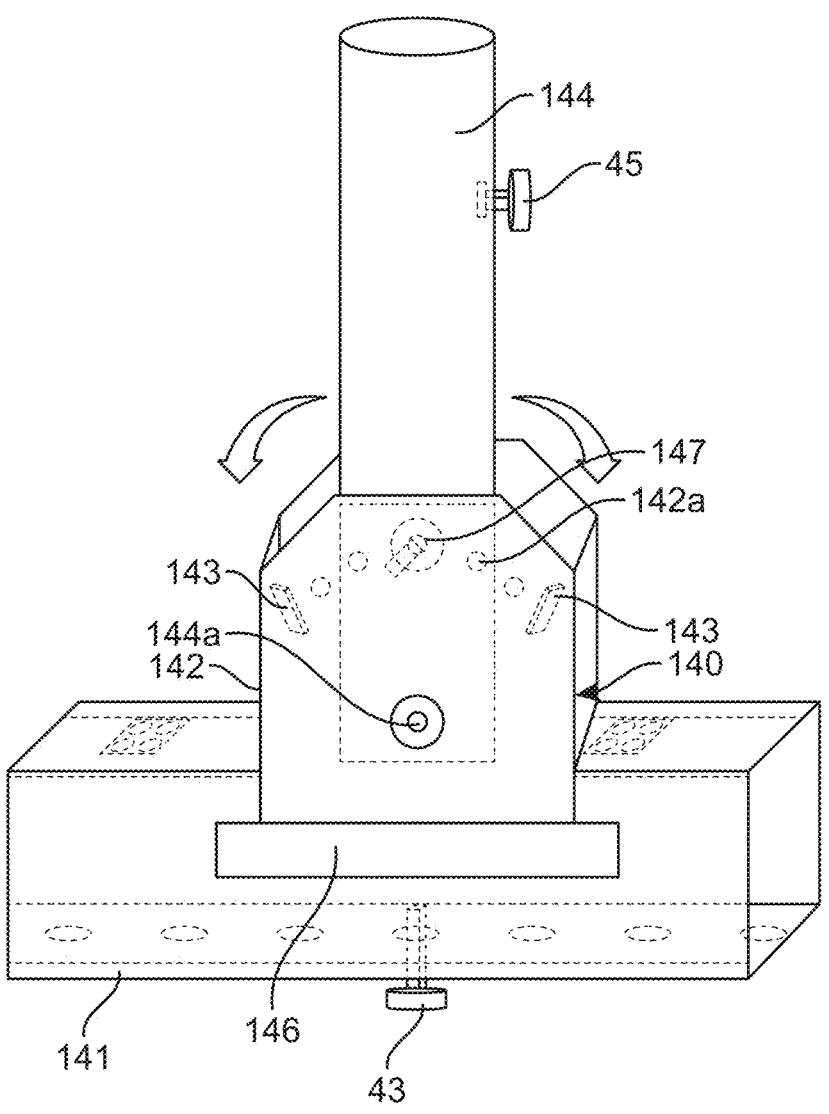
FIG. 8 is an enlarged view of the first alternative holder assembly 140 with an incorporated tilt mechanism.
Figure 9:
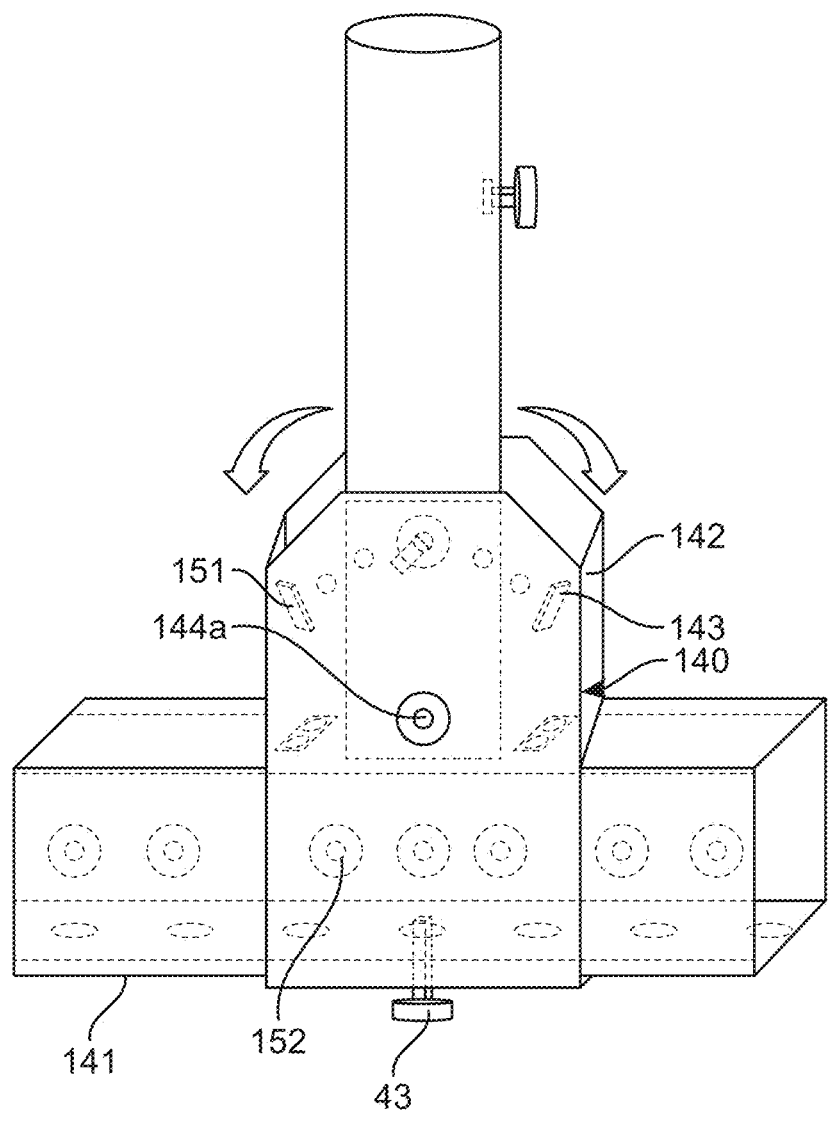
FIG. 9 is an enlarged view of the first alternative holder assembly 140 with wheels 152.
Figure 10:
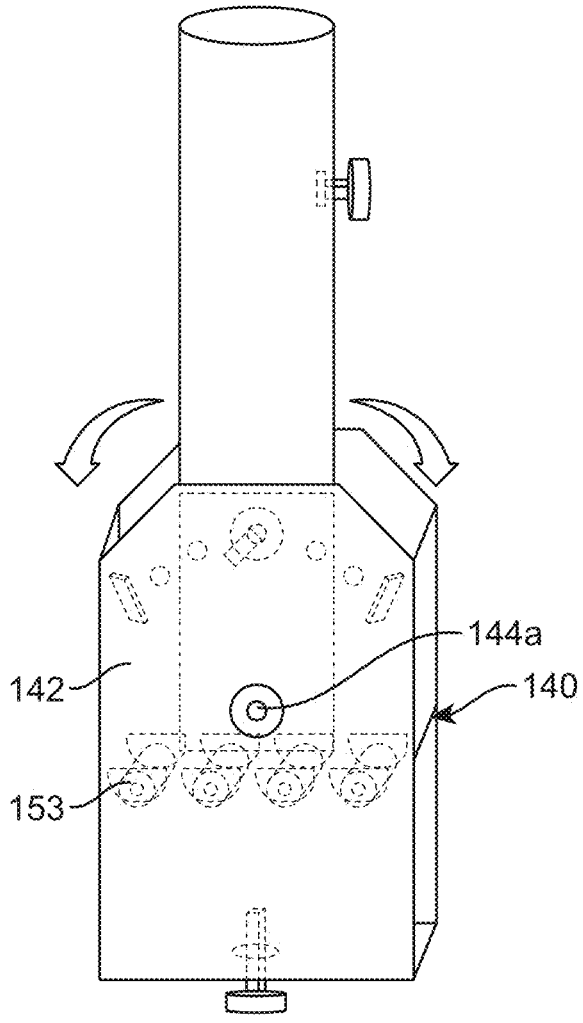
FIG. 10 is an enlarged view of the first alternative holder assembly 140 with rollers 153.

Referring now to FIG. 8, a first alternative holder assembly 140 can be observed. The first alternative holder assembly 140 may have a first alternative holder base 142 with fixing portions 146. The first alternative holder base 142 may have a bottom portion attached to a horizontal support 141 for stability. The fixing portions 146 may be located on the lower portion of the lateral sides of the first alternative holder base 142, for instance, the fixing portions 146 may depict that the first alternative holder base 142 and the horizontal support 141 are welded together. The first alternative holder assembly 140 may include a pole holder 144 with a bottom end pivotally coupled to the first alternative holder base 142 by a pivot 144a or a hinged mechanism. The pivot 144a may allow the pole holder 144 pivoting, allowing an umbrella assembly 60 to tilt. The first alternative holder base 142 may have holes 142a at different locations thereof to allow securing the pole holder 144 at a desired position by inserting a lock pin 147 in one of the holes 142a. The first alternative holder assembly 140 may further include stoppers 143 located inside the first alternative holder base 142. The lock pin 147 may restrict the inclination of the pole holder 144. The pole holder 144 may have a second lock member 45 to secure an umbrella assembly 60. The first alternative holder assembly 140 may have the lock member 43.

The first alternative holder base 142 may have a horizontal support 141 provided with a bottom portion having lateral openings to slidably receive the support rail 22 thereinside. The first alternative holder base 142 may have wheels 152 inside the holder base to run in a groove on one or more multiple sides of the support rail 22. An alternative to wheels (or a combination of the two) may be ball bearings to facilitate the sliding of the first alternative holder base 142 along the support rail 22. It also may be suitable to incorporate rollers 153 inside the first alternative holder base 142 to facilitate movement along the support rail 22. Alternatively, the rollers 153 may be placed on the top side of the support rail 22 to facilitate the holder base 42 sliding therealong.

Second Alternative Embodiment

Figure 11:
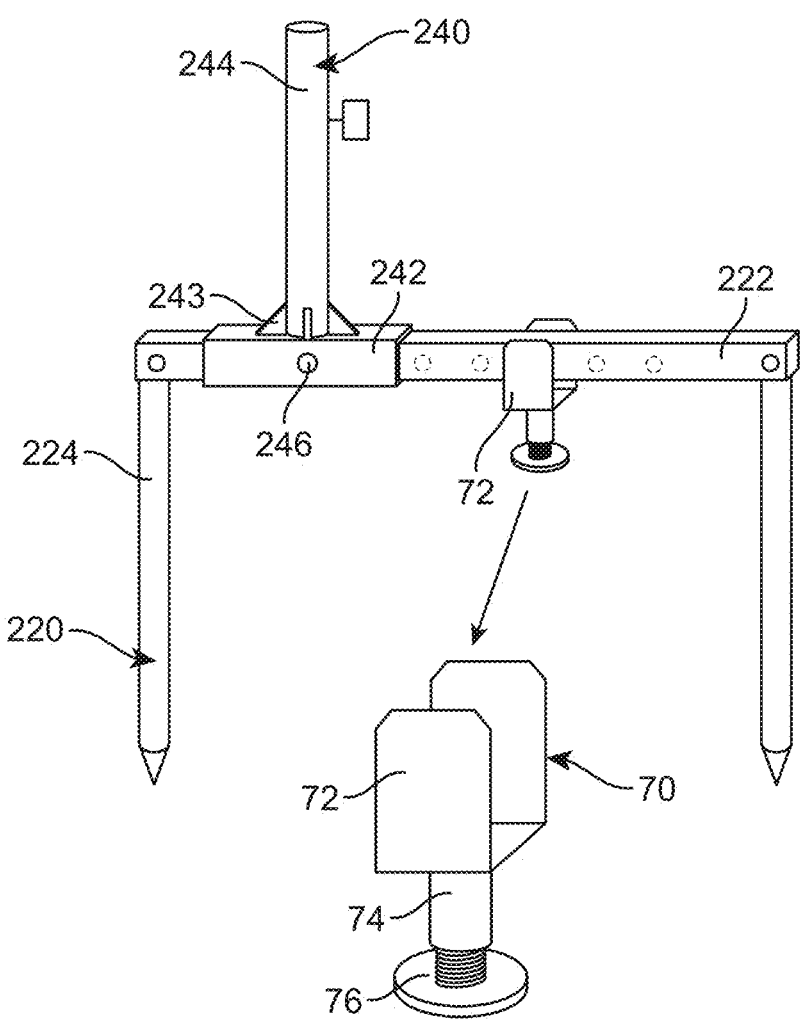
FIG. 11 is an enlarged view of the second alternative holder assembly 240 coupled to a second alternative rail assembly 220.

Referring now to FIG. 11, a second alternative rail assembly 220 with a second alternative holder assembly 240 is depicted. The second alternative rail assembly 220 may include posts 224 perpendicularly and removably connected to distal ends of support rail 222. The support rail 222 may be a unitary solid piece. The support rail 222 may have a plurality of holes to allow securing the second alternative holder assembly 240 with a screw member 246. The second alternative holder assembly 240 may include holder base 242 in the shape of a rectangular tube. The holder base 242 may have a pole holder 244 perpendicularly attached to a top portion thereof. The pole holder 244 may be secured with reinforcement members 243. A support assembly 70 may be provided to provide additional support for the rail to stop the oscillation caused by the wind, especially if the support rail 22 is made of lighter material such as plastic, to facilitate transportation. The support assembly 70 may include a top portion 72 with a bottom portion 74 and a disc 76. The a top portion 72 may be U-shaped facing upwards to be engaged to the support rail 222. The bottom portion 74 may be attached to the lower side of the a top portion 72. The bottom portion 74 may be cylindrical and have a threaded portion to allow engagement of the disc 76 thereto. The disc 76 may be removed to allow screwing an additional post with a top female threaded portion to be engaged with the threaded portion of the bottom portion 74. The pole holder 244 may have a tightening screw or clasp to fix the pole 62.

Figure 15:
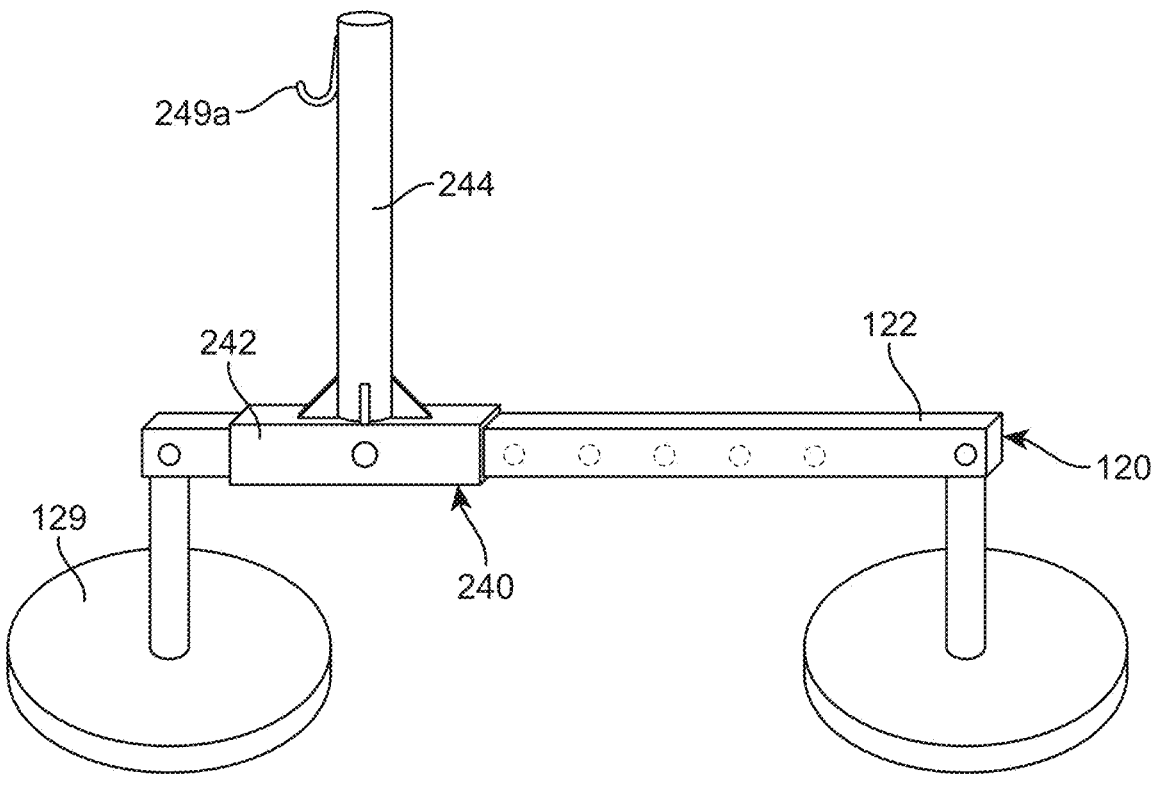
FIG. 15 illustrates an isometric view of a first alternative rail assembly 120 with bases 129.

Best observed in FIG. 15, the pole holder 244 may have a hook 249a for hanging a bag, towel or the like. The hook 249a may be attached to a top portion of the pole holder 244. The pole holder 244 may have multiple hooks.

It also may be suitable to have a first alternative rail assembly 120 with bases 129 in the vertical posts to support the support rail 122. The bases 129 may be made of a heavy material to provide stability to the first alternative rail assembly 120. The bases 129 may be made of a metal, cement, filled with a liquid such as water, or any other suitable material. The bases 129 may have a circular shape or any other suitable shape.

Figure 16:
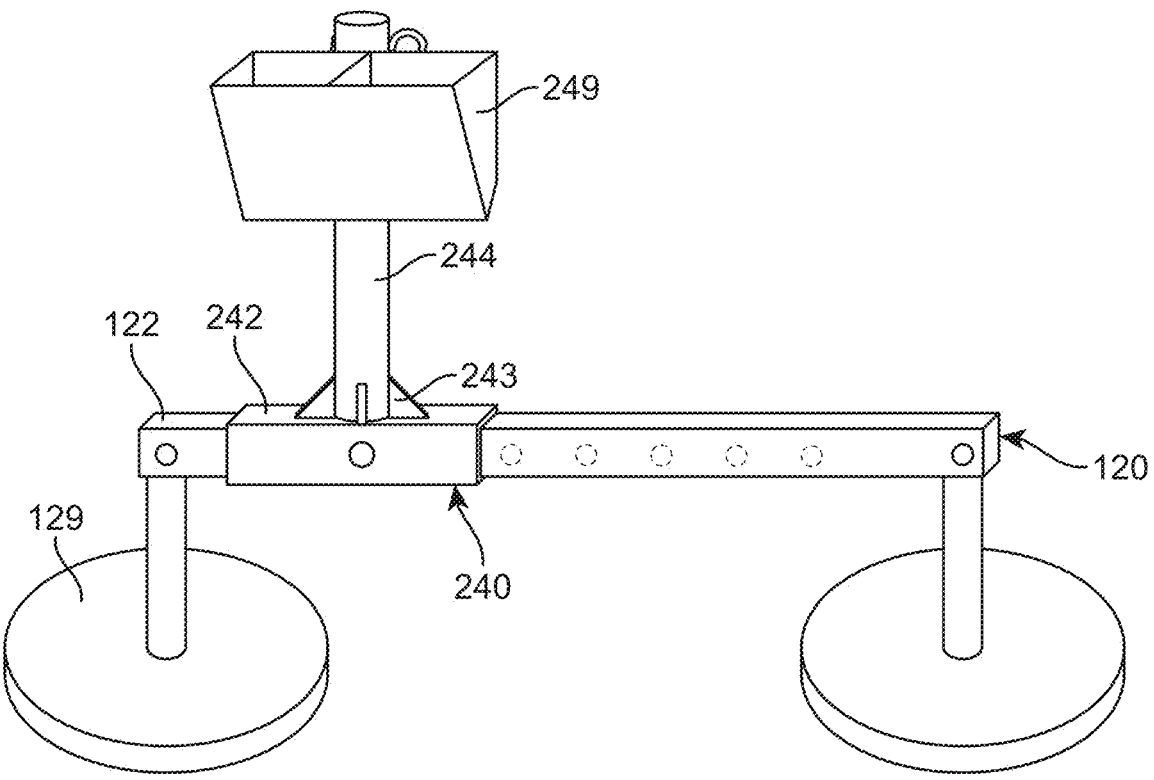
FIG. 16 depicts an isometric view of the first alternative rail assembly 120 with the pole holder 244 having a storage compartment 249.

The pole holder 244 may further include a storage compartment 249 as observed in FIG. 16. The storage compartment 249 may be welded to the pole holder 244. It also may be suitable to secure the storage compartment 249 to the pole holder 244 by bolts, rivets, glue or any variation thereof. The storage compartment 249 may be a doubled compartment with a substantially trapezoid shape. The storage compartment 249 may be removably secured to the pole holder 244. The storage compartment 249 may be connected and disconnected. The storage compartment 249 may be suitable for storing cellphones, sunglasses, keys, or any other suitable item.

Third Alternative Embodiment

Figure 12:
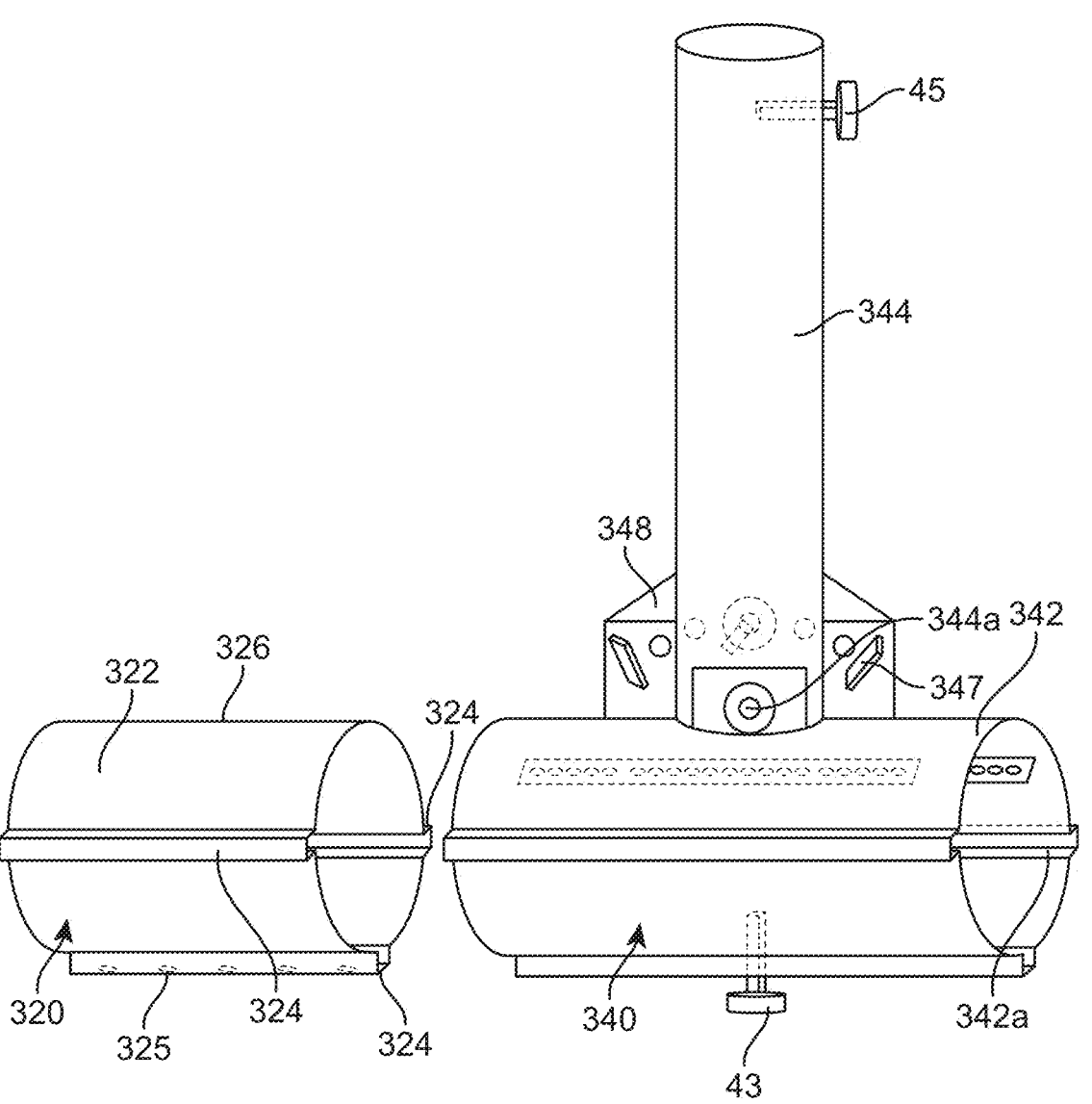
FIG. 12 is an enlarged view of a third alternative holder assembly 340.
Figure 13:
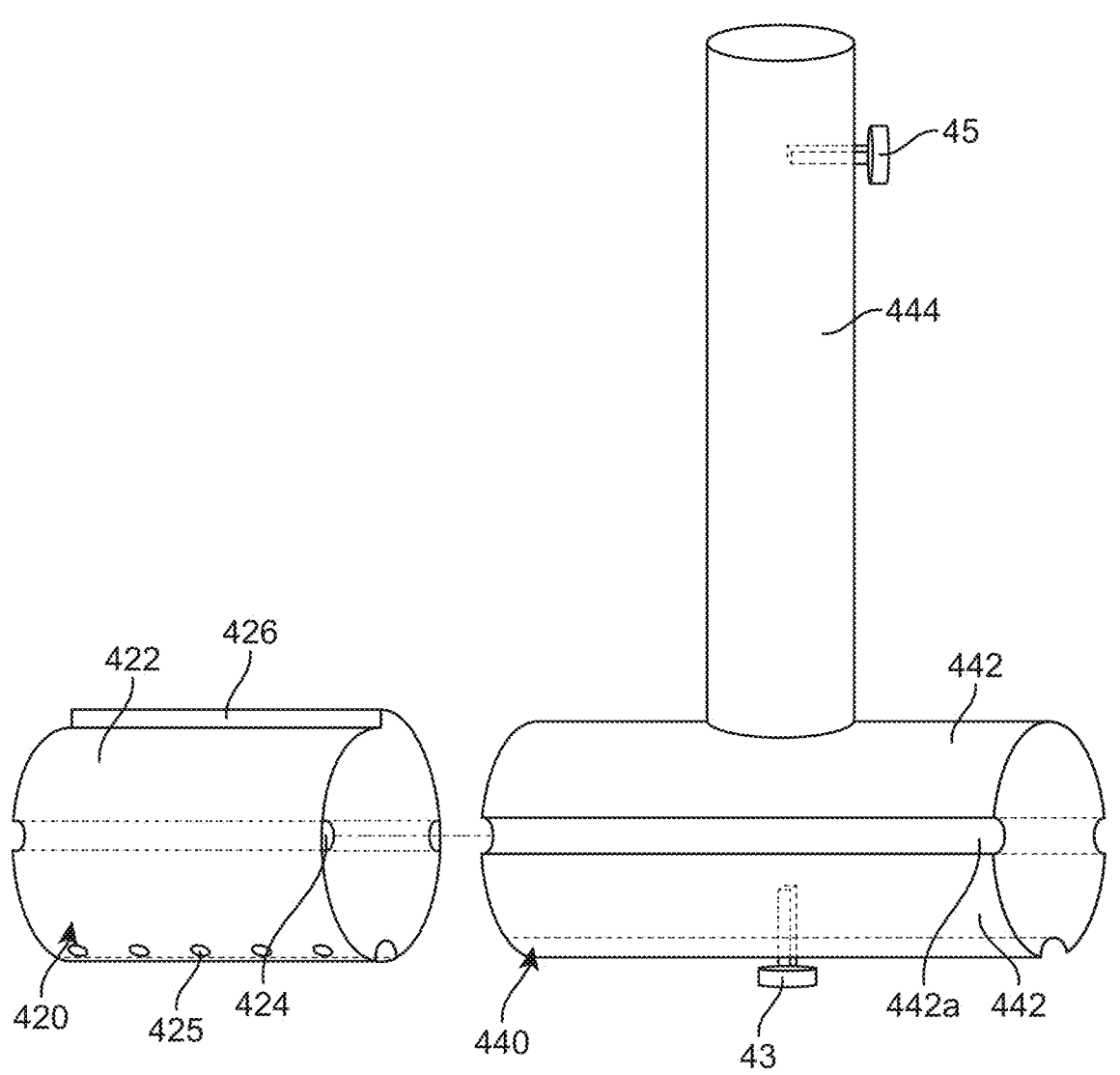
FIG. 13 is an enlarged view of a fourth alternative holder assembly 440.

Referring now to FIG. 12, a third alternative rail assembly 320 and third alternative holder assembly 340 may be provided in cylindrical shapes. The third alternative rail assembly 320 may include an alternative support rail 322 with a cylindrical shape. The alternative support rail 322 may have internal guides 324 along a length thereof. The alternative support rail 322 may have a plurality of holes 325 to allow securing the third alternative holder assembly 340 at a position using a lock member 43.

The third alternative holder assembly 340 may include an alternative holder base 342 with protruding guides 342a.

The protruding guides 342a may be located on external surface of the alternative holder base 342. The alternative holder base 342 may have slightly larger diameter than that of the alternative support rail 322 to slidably receive the alternative support rail 322 therein. The protruding guides 342a may be slidably coupled with the guides 324 allowing the alternative holder base 342 to slide along the alternative support rail 322.

The third alternative holder assembly 340 may include a pole holder 344 pivotally secured thereto by a pivot 344a. The third alternative holder assembly 340 may have a support member 348 having stoppers 347 to limit the range of inclination of the pole holder 344. The pole holder 344 may include a second lock member 45 to secure a pole. It should be noted that said pivot 344a can be incorporated into any one of the embodiments as detailed throughout the specification without limiting it to the configuration of the exemplary third embodiment.

Fourth Alternative Embodiment

Yet another alternative embodiment includes a fourth alternative holder assembly 440 and a fourth alternative rail assembly 420. The fourth alternative holder assembly 440 and fourth alternative rail assembly 420 may be cylindrical. The fourth alternative rail assembly 420 may include second alternative support rail 422 with a plurality of protruding guides 424 along a length thereof. The second alternative support rail 422 may have a plurality of holes 425 to allow a lock member 445 to secure the fourth alternative holder assembly 440 at a position in the third alternative rail assembly 320. The fourth alternative holder assembly 440 may include a second alternative holder base 442 with slotted guides 442a on an external surface thereof to be slidably coupled to the fourth alternative rail assembly 420. The fourth alternative holder assembly 440 may include the pole holder 444 perpendicularly attached to a top portion of the second alternative holder base 442 The pole holder 444 may include the second lock member 45 or tightening device to hold the umbrella assembly 60.

Figure 17:
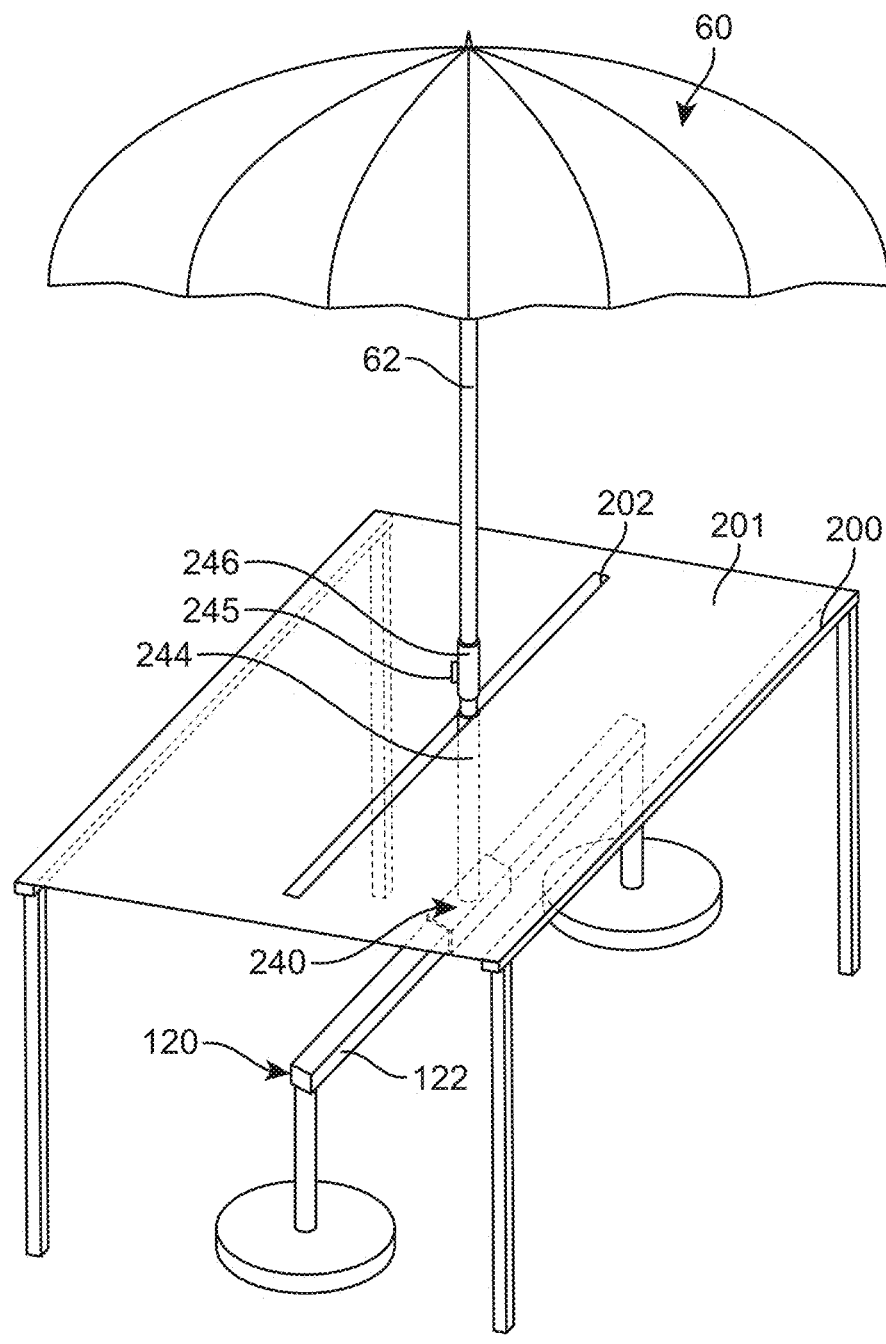
FIG. 17 is an isometric operational view of the second alternative holder assembly 240 adapted to a table 200 and different locking/unlocking mechanism 245.

Referring now to FIG. 17, the first alternative rail assembly 120 with the second alternative holder assembly 240 may be installed under a table 200. The first alternative rail assembly 120 may be placed under the table 200. The table 200 may have a slit 202 along a center of the top surface 201 thereof. The extended pole holder 244 may slide through the slit 202 holding the pole 62 of the umbrella assembly 60. The pole holder 244 may have a button 245 for easier access above the level of the table to facilitate access. The movable umbrella may allow optimal location of the shade at any time. In an alternative embodiment, the rail may be integrated into the table, eliminating the need for separate legs to support both the rail and the holder. Instead of being a standalone component, the rail becomes an integral part of the table.

Multiple embodiments of the movable umbrella holder have been described herein. It should be understood that features of particular embodiments might be combined with other embodiments. The different embodiments of the support rails and vertical posts may be manufactured in different sizes. Preferably the support rails and vertical posts may be made of metal, plastic or any other suitable material. The support rail may be a horizontal rail. The support rail and the holder base of the umbrella holder may be round with raised or indented guides to prevent rotation of the holder around the rail. The support rail and the base holder section may be square to avoid the rotation around the axis of the rail.

Different embodiments of the base holder may rest directly on the support rail or on ball bearings, wheels, or another suitable system for ease of movement. The holder base may have a pin that, in different embodiments, may be a screw pin or a pulled-out and reinserted type of pin. Multiple embodiments of the support rail and the base holder may have a plurality of holes, preferably located on the bottom thereof to allow water to evacuate.

Different embodiments of the holder assembly may include a pivot or hinged mechanism that allows to change of the tilt of the umbrella in relation to the support rail, allowing great flexibility to the location and orientation of the shade produced by the umbrella. The pivot or hinge mechanism may further include a pin to fix the tilt at a desired angle. Stoppers may prevent the umbrella from having an excessive tilt angle.

It should be understood that the different components of the present invention including the rail assembly 20 and holder assembly 40 and the different embodiments, may be made of materials suitable to be used in wet and corrosive environments (such as salty environments at the beach). For example, the holder assemblies and rail assemblies may be made of stainless steel or any other metal with a plastic coating or any other coating suitable for preventing corrosion, such as black oxide coating. The rail assembly 20 and holder assembly 40 and the different embodiments may be made of heavy-duty materials for large beach umbrellas suitable for beach clubs and hotels. The rail assembly 20 and holder assembly 40 may also be made of lightweight materials such as plastic or other light but strong material to hold light umbrellas. Each of the different embodiments of the rail assembly 20 may have a heavy base disc such as the bases 129 to support the support rail or to have stakes to be buried in the sand or ground. It also may be suitable for any of the different embodiments of the rail assembly to have clasps or other tightening mechanisms to attach the movable umbrella holder to a lawn chair 100 or another piece of furniture.

The movable umbrella holder may be integrated or separated into a lawn chair 100. Instead of (or in addition to) ball bearings or wheels to facilitate the movement of the umbrella holder along the rail, the movement may also be facilitated by tracks or roller rails similar to those found in sliding doors and pallet movers. The roller rails may be on the support rail or in the holder base. The sliding mechanisms may also be easily removed to be replaced due to the corrosive nature of beach environments. The wheels and other parts may be of stainless steel or of plastic to reduce corrosion due to salt and water.

The foregoing description conveys the best understanding of the objectives and advantages of the present invention. Different embodiments may be made of the inventive concept of this invention. It is to be understood that all matter disclosed herein is to be interpreted merely as illustrative and not in a limiting sense.

What is claimed is:

1. A sliding umbrella holder system, comprising:
a base assembly including a support rail supported by at least two vertical poles, said support rail being substantially horizontal and parallel to a ground surface, and having a square cross-section with flat sides and corners to resist rotation relative to an attached holder assembly, said vertical poles being securable to one or more of:
a ground surface, a freestanding base, or a piece of outdoor furniture;

said holder assembly including a holder base defining a square sleeve rail so as to surround said support rail for guided linear translation of the holder assembly along substantially the entire length of the support rail, and a pole holder secured to said holder base and configured to receive and secure a sun umbrella;
a locking mechanism associated with said holder base and operable to selectively engage said support rail to fix the position of said holder assembly along said rail;
wherein said base assembly and said holder assembly together form a self-supporting structure independent of any chair, table, or backrest, such that the umbrella position is adjustable along the support rail.

2. The sliding umbrella holder system of claim 1, wherein said support rail is extendible along a longitudinal axis thereof.

3. The sliding umbrella holder system of claim 1, further comprising ball bearings located in the interior of said holder base to facilitate sliding along the support rail.

4. The sliding umbrella holder system of claim 1, wherein said pole holder comprises multiple inserts to accommodate umbrella poles of different diameters.

5. The sliding umbrella holder system of claim 1 further including a rotating table coupled to the pole holder.

6. The sliding umbrella holder system of claim 1, further comprising a pivoting mechanism allowing tilting of the umbrella pole.

7. The sliding umbrella holder system of claim 6, further comprising stoppers to limit the range of tilting of said pole holder.

8. The sliding umbrella holder system of claim 7, further comprising a hook attached to the pole holder for hanging accessories.

9. The sliding umbrella holder system of claim 7, further comprising a storage compartment attached to the pole holder.

10. The sliding umbrella holder system of claim 7, wherein said pole holder has a holder base with ball bearings, wheels or rollers to facilitate movement along the support rail.

11. The sliding umbrella holder system of claim 7, wherein the support rail includes internal trusses to increase structural strength.

12. A movable umbrella holding structure, comprising:
a rail assembly including at least two vertical poles configured to be securable to ground or to bases; a support rail connected to said vertical poles, the rail assembly further including a plurality of internal trusses positioned within said support rail to increase structural strength;
a holder assembly including a holder base slidably mounted on said support rail; a pole holder perpendicularly connected to said holder base; said pole holder configured to receive and secure a sun umbrella; said holder base comprising ball bearings, wheels or rollers to facilitate movement along the support rail;
a locking mechanism on said holder assembly, operable to selectively fix the position of said holder base along said support rail;
wherein said pole holder further includes multiple diameter-reducing inserts to accommodate umbrella poles of different diameters; a rotating table; a pivoting mechanism allowing tilting of the umbrella pole; stoppers to limit the range of tilting; a hook for hanging accessories; a storage compartment;

wherein said holder assembly is moveable along said support rail to adjust the position of a sun umbrella without relocating said vertical poles or the base of said sun umbrella;

wherein said rail assembly and said holder assembly are comprised of materials resistant to corrosion in outdoor environments;

wherein said holder assembly is adaptable to be incorporated into a chair frame.

13. The movable sun umbrella holding structure of claim 12, wherein the rotating table has an attaching portion that is coupled to the pole holder.

14. The movable sun umbrella holding structure of claim 12, wherein the pivoting mechanism includes a pivot connecting a bottom end of the pole holder with the holder base.

15. The movable sun umbrella holding structure of claim 12, wherein the stoppers are located at a support member of the holder base.

16. The movable sun umbrella holding structure of claim 12, wherein the hook is attached to a top portion of the pole holder.

17. A movable sun umbrella holding structure, consisting of:

a rail assembly consisting of:

a support rail having a length and having internal trusses arranged in a triangular pattern to increase structural strength;

first and second vertical posts, each post having a lower end configured with a sharpened portion for ground insertion or a base plate for surface mounting, wherein said posts are removably secured to opposing ends of said support rail and oriented perpendicular to a longitudinal axis of said support rail;

a holder assembly consisting of:

a holder base having a hollow interior shaped to slidably receive said support rail;

a set of ball bearings or rollers mounted within said holder base to facilitate sliding movement along said support rail;

a pole holder extending perpendicularly from said holder base;

a first locking mechanism mounted on said holder base for securing the holder base position along said support rail;

a second locking mechanism mounted on said pole holder for securing an umbrella pole;

a set of diameter-reducing inserts configured to be selectively inserted into said pole holder to accommodate different umbrella pole diameters;

a pivot mechanism connecting said pole holder to said holder base, said pivot mechanism including a hinge and a pivot lock for adjusting and fixing a tilt angle of said pole holder; mechanical stops mounted to limit the range of said tilt angle; a rotating table mounted around said pole holder; at least one hook mounted on said pole holder for hanging accessories; and a storage compartment mounted to said pole holder;

wherein said holder assembly is moveable along said support rail to adjust the position of a sun umbrella without relocating said vertical posts;

wherein said rail assembly and said holder assembly are comprised of corrosion-resistant materials selected from the group consisting of stainless steel, coated metals, and reinforced plastics; and wherein said holder assembly is configured to be mounted to a chair frame through mounting clamps.

* * * * *